United States Patent Office 3,318,681
Patented May 9, 1967

3,318,681
HERBICIDAL COMPOSITIONS AND METHOD
John Yates, Whitstable, Kent, England, assignor to Shell Oil Company, New York, N.Y., a corporation of Delaware
No Drawing. Filed Mar. 8, 1965, Ser. No. 438,036
Claims priority, application Great Britain, Jan. 5, 1961, 520/61
4 Claims. (Cl. 71—2.6)

This application is a continuation-in-part of Ser. No. 161,379, filed Dec. 22, 1961, now abandoned.

This invention relates to the use of novel thiobenzamides and derivatives thereof and to herbicidal compositions thereof. These compounds possess marked herbicidal, particularly seedicidal, properties. The invention relates to the treatment of agricultural areas wherein crops are growing, the treatment of areas intended for crop production or the treatment of non-agricultural areas for weed control.

The novel di-ortho-halothiobenzamides of this invention have been found to be particularly effective as herbicides. Although thiobenzamides having a single halogen atom on the phenyl ring are known in the art, they posses little or no herbicidal activity. It is therefore surprising that the inclusion of one more halogen atom in the ortho position of the phenyl ring should convert relatively biologically-inert 2-halothiobenzamide into a herbicide of outstanding utility.

The heribicidal di-ortho-halothiobenzamides of the invention are those compounds represented by the structure:

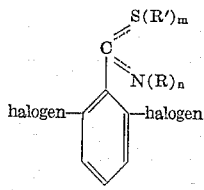

wherein $m$ equals 0 to 1, $n$ equals 1 to 2 and $m+n$ equals 2; R represents hydrogen, alkyl of 1 to 4 carbon atoms or phenyl when $n$ equals 1 and when $n$ equals 2, R is alkyl of 1 to 4 carbon atoms; and R' represents hydrogen, or a group containing 1 to 4 carbon atoms selected from alkyl, chloroalkyl, bromoalkyl, or acyl.

The halogen substitutions in the 2,6-positions may be chlorine, bromine, fluorine or iodine. As will be pointed out in the working examples, substitution in the 2,6-position is critical. In fact the dihalothiobenzamides are excellent general herbicides while the monhalobenzamides are generally ineffective.

The actual constitution of the thioamides is not known with certainty. Under some conditions they act as thioamides and under other as isothioamides and consequently derivatives prepared from the thioamides may have normal or iso-structure. For example, S-ethers are obtained on reacting the thioamide with an alkyl halide. It is also possible that both forms exist simultaneously. Accordingly, the invention relates to compounds of either structure or to mixtures thereof, unless a specific structure is assigned to a particular compound or class of compounds. The compounds of the invention form salts with acids or bases. It is probable that the salts are salts of the isothiobenzamides. The preferred salts are the alkali metal, especially sodium, ammonium and amine, especially di- and triethylamine and alkanolamine salts, salts of heterocyclic nitrogeneous bases, for example, pyridine, and the mineral acid salts especially the hydrochlorides and hydrobromides.

When $m$ equals 1, R' can also be an unsaturated group represented by R" and such a divalent hydrocarbon linkage gives rise to the following bis structure

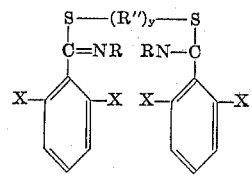

wherein X is chlorine or bromine; R is hydrogen or alkyl of 1 to 4 carbon atoms, alkenylene of up to 10 carbon atoms, phenylene, or xylyl and y=0 to 1.

Preferred because of their outstanding properties as herbicides are those compounds of the formula

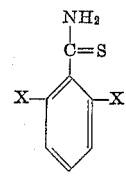

where X is either chlorine or bromine. 2,6-dichlorothiobenzamide and 2,6-dibromothiobenzamide have been shown to be effective plant eradicants.

Compounds of the invention include, for example, 2-chloro-6-fluorothiobenzamide
2-chloro-6-iodothiobenzamide
2-chloro-6-bromothiobenzamide
2,6-difluorothiobenzamide
2,6-dichloro-S-methylthiobenzamide
2,6-dichloro-S-propyl thiobenzamide
2,6-dichloro-S-chloromethyl thiobenzamide
2,6-dichloro-S-chloroethyl thiobenzamide
N-acetyl-2,6-dibromothiobenzamide
N-methyl-2,6-dichlorothiobenzamide
N-phenyl-2,6-dichlorothiobenazmide
N,N-dimethyl-2,6-dichlorothiobenzamide
S,S'-(1,4-but-2-enylene)-bis-2,6-dichlorothiobenzimidate
S,S'-(1,4-butylene)-bis-2,6-dichlorothiobenzimidate
2,6-dichlorothiobenzamide, pyridine salt
2,6-dichloro-S-methylthiobenzimidate, hydrochloride salt The 2,6-halothiobenzamides or haloisothiobenzamides of the invention may be prepared by any method known in the art for preparing thiobenzamides or isothiobenzamides. Thus, one process for their preparation comprises reacting phosphorus pentasulfide with the halobenzamide or reacting aluminum sulfide in the presence of hydrated sodium sulfate with either the halobenzamide or with the ammonium halobenzoate. Since 2,6-dihalobenzonitrile cannot readily be hydrolyzed under alkaline conditions it was very surprising to find that an addition reaction between this nitrile and hydrogen sulfide was readily effected giving a good yield of 2,6-dihalothiobenzamide. Accordingly, a particularly suitable method of preparing the thiobenzamides of the invention comprises reacting the appropirate halobenzonitrile with hydrogen sulfide. The reactants may be heated together in presence of an alkali metal hydrogen sulfide or ammonium hydrogen sulfide in a closed vessel. Preferably, the nitrile is heated with liquid hydrogen sulfide containing a small proportion of a strong organic nitrogeneous base, for example, a secondary aliphatic amine such as dimethylamine or diethylamine or an alkanolamine, in an autoclave at about 50° C. A particularly suitable method of carrying out this reaction compirses treating a solution of the nitrile in pyridine, dimethyl formamide or an alcohol containing a strong nitrogenous base, particularly a tertiary amine, for example, triethylamine, or an alkanolamine, with hydrogen sulfide. The alcohol used preferably contains 1 to 4 carbon atoms, isopropyl alcohol being particularly suitable. The nitrogenous base is used in an amount preferably equivalent to the nitrile or slightly in excess thereof. The reaction commences at room temperature and proceeds with evolution of heat. The solution is preferably saturated with hydrogen sulfide.

Compounds of the invention having the bis-structure given above may be obtained by treating the appropriate isothiobenzamide with an oxidizing agent, for example, ferric chloride or iodine, to give the disulfide or by reacting the isothiobenzamide with the dihalide HalR″Hal wherein R″ has the meaning hereinbefore specified. The reaction may be carried out in one stage by reacting the dihalide with two molecular proportions of the isothiobenzamide, preferably by heating together in a solvent, for example, an alcoholic solvent, or the reaction may be effected in 2 stages, in the first of which the dihalide is reacted with one molecular proportion of the isothioamide to give a product of formula

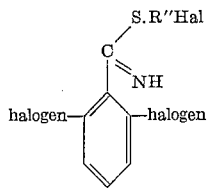

wherein the symbols have the aforesaid meanings and subsequently reacting this intermediate product with a second molecular proportion of the isothiobenzamide to give the bis-product.

Thiobenzamides of the above general formula in which one or each hydrogen atom attached to the nitrogen atom is replaced by a hydrocarbyl group, may be prepared according to the invention by reacting ammonia or a primary or secondary amine with a halothiobenzoic acid or ester,

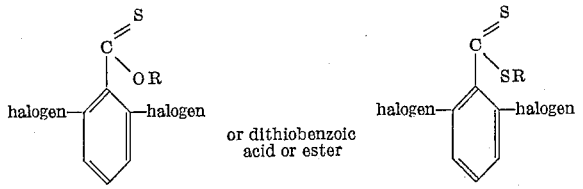

or dithiobenzoic acid or ester wherein R represents a hydrogen atom or a hydrocarbyl group, preferably an alkyl group of 1 to 4 carbon atoms, or with a halothiobenzoyl halide, preferably the chloride.

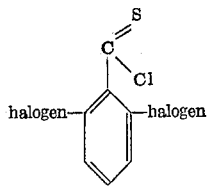

Preferably, the 2,6-dichlorothionobenzoic acid, ester or chloride are used. The halothiobenzoyl chloride may be prepared by reacting the halothiobenzoic acid with thionyl chloride or with oxalyl chloride.

Preferably, these N-substituted thiobenzamides are prepared from the corresponding N-substituted benzamides by treatment with phosphorus pentasulfide.

Halobenzthioimino ethers may be prepared by reacting the appropriate halothiobenzamide, particularly 2,6-dichlorothiobenzamide, with a halide R′A, or with a sulfate $(R'O)_2SO_2$ wherein R′ has the meaning hereinbefore specified and A represents a halogen atom, especially bromine. The resulting hydrogen halide or hydrogen sulfate salt can be converted to the free base by treatment, for example, with aqueous alkali. The thioiminoether alkyl hydrogen sulfate obtained may, if desired, be converted to the hydrohalide by treatment with a hydrogen halide. Acyl derivatives of the halothiobenzamides, for example, 2,6-dichlorothiobenzamide, may be prepared according to the invention by reacting the thioamides with an acylating agent, preferably an acyl halide or anhydride.

The following examples illustrate the preparation of the novel thiobenzamides and their derivatives according to the invention. In these examples, parts by weight (w.) and parts by volume (v.) bear the same relation as the kilogram and the liter.

*Example I.—Preparation of 2,6-dichlorothiobenzamide*

(A) Triethylamine (25 w., 0.25 M) was added to a solution of 2,6-dichlorobenzonitrile (34.4 w., 0.2 M) in dry pyridine (150 v.). Dry hydrogen sulfide was bubbled through the stirred mixture. The reaction temperature rose to about 35° C. and then commenced to fall, and the reaction mixture changed in color from yellow to dark red. After hydrogen sulfide has been passed for two hours, the mixture was poured into water (1000 v.) giving a red oil which solidified on stirring. The solid was collected, washed well with water and airdried. During drying, the melting point rose from about 60° C. to 144° to 148° C. giving a pale yellow solid (40.5 w., theory 41.5 w.). It is believed that the initial precipitate may be amine-salt of the thiolform of

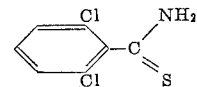

with either pyridine and/or triethylamine and that on drying the base evaporates.

Crystallization from a mixture of benzene and light petroleum gave 2,6-dichlorothiobenzamide as stout, white prisms, M.P. 151° to 152° C., in 70% yield.

*Analysis.*—Found: C, 41.0; H, 1.9; N, 6.9; Cl, 34.6; S, 16.0%. $C_7H_5Cl_2NH$ requires: C, 40.8; H, 2.4; N, 6.8; Cl, 34.5; S, 15.6%.

(B) A mixture of 2,6-dichlorobenzonitrile (34.4 w.), isopropyl alcohol (250 v.) and ethanolamine were heated together under reflux while hydrogen sulfide was passed through the mixture. The color changed almost immediately from yellow to green. After 2 hours, the reaction mixture was poured into water and the precipitate collected. It had M.P. 112° to 130° C. After recrystallization from benzene, pure 2,6- dichlorothiobenzamide (27 w.) of M.P. 150° to 151° C. was obtained. Yield 67%.

*Example II.—2-chloro-6-fluorothiobenzamide*

Was prepared from 2-chloro-6-fluorobenzonitrile in a manner analogous to that described in Example I. The crude product was recrystallized from a mixture of benzene and light petroleum (B.P. 60°–80° C.). Yield 42%.

*Analysis.*—Found: Cl, 18.5; S, 17.1%. $C_7H_5ClFNS$ requires: Cl, 18.7; S, 16.9%.

*Example III.—2-chloro-6-iodothiobenzamide*

Was prepared from 2-chloro-6-iodobenzonitrile in a manner analogous to that described in Example I. The crude product was recrystallized from benzene. Yield 71%. M.P. 136–7° C.

*Analysis.*—Found: Cl, 11.7; S, 11.3%. $C_7H_5ClINS$ requires: Cl, 11.3; S, 10.8%.

*Example IV.—Preparation of N-acetyl-2,6-dichlorothiobenzamide*

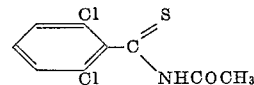

2,6-dichlorothiobenzamide (25 w., 0.12 M) was dissolved in ether (300 v.) and triethylamine (20.2 w., 0.2 M) was added. The solution was cooled to 10° C. and stirred during the addtion of acetyl chloride (12.6 w., 11.5 v., 0.16 M) in ether (50 v.). The precipitate of amine salt was filtered off and the orange-colored solution was evaporated and the residue (13 w.) was boiled three times with hexane using 50 v. each time. Bright orange prisms (8.2 w.) of S-acetyl 2,6-dichlorothiobenzimidate, M.P. 184°–185° C. remained.

*Analysis.*—Found: C, 44.2; H, 3.0; N, 5.6; Cl, 28.8; S, 13.3%. C₉H₇ONCl₂S requires: C, 43.6; H, 2.8; N, 5.6; Cl, 28.6; S, 12.9%.

Evaporation of the hexane extracts gave 2,6-dichlorobenzonitrile, M.P. 138°–141° C.

*Example V.—Preparation of S-ethyl-2,6-dichlorothiobenzimidate hydrobromide*

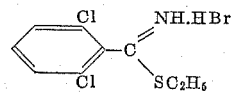

2,6-dichlorothiobenzamide (10.3 w.) and ethyl bromide (25 v.) were heated together under reflux for 24 hours. Excess ethyl bromide was stripped off and the residue was extracted six times with 25 v. lots of hot benzene. The pale yellow residue was then washed with ether and air dried. The residue consisted of pale yellow prisms of the hydrobromide (2.3 w.), M.P. 200° C., with decomposition and evolution of ethyl mercaptan.

*Analysis.*—Found: N, 4.6; S, 10.3; Cl, 22.4; Br, 25.1%. C₉H₁₀NSCl₂Br requires: N, 4.5; S, 10.2; Cl, 22.6; Br, 25.4%.

Unchanged 2,6-dichlorothiobenzamide was recovered from the benzene and ether extracts on evaporation. The reaction can also be performed using an aromatic hydrocarbon solvent, for example, benzene, or an ethereal solvent, to promote a homogenous reaction.

*Example VI.—Preparation of S-ethyl 2,6-dichlorothiobenzimidate hydrochloride*

2,6-dichlorothiobenzamide (25 w.) was dissolved in ether (300 v.) and triethylamine (20.2 w.) added. The solution was stirred and cooled in water at room temperature while a solution of diethyl sulfate (35.9 w.) in ether (50 v. was gradually added. Stirring was continued for a further 2 hours. The ethereal solution was then separated, washed once with water (200 v.) and dried over anhydrous magnesium sulfate. The ether was then evaporated from the dried solution and the residual oil was dissolved in a minimum of water. Acidification with concentrated hydrochloric acid precipitated the desired hydrochloride (13 w.), M.P. 197°–198° C. (decomp.).

*Aanalysis.*—Found: C, 40.1; H, 3.8; S, 12.7; N, 5.0; Cl, 39.5%. C₉H₁₀NSCl₃ requires: C, 40.0; H, 3.7; S, 11.9; N, 5.2; Cl, 39.4%.

S-ethyl 2,6-dichlorothothiobenzimidate was obtained by neutralizing an aqueous solution of the hydrochloride with aqueous sodium acetate solution. The resulting oil crystalized on standing and was recrystallized from light petroleum (B.P. 40°–60° C.). It had M.P. 30° C. Yield was quantitative.

*Analysis.*—Found: Cl, 30.1; S, 13.7%. C₉H₉Cl₂NS requires: Cl, 30.2; S, 13.7%.

*Example VII.—Preparation of S-2-bromoethyl 2,6-dichlorothiobenzimidate*

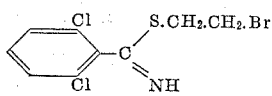

A mixture of 2,6-dichlorothiobenzamide (10 w.) and ethylene dibromide (10 v.) was heated on a boiling water bath for 6 hours and then cooled. The product was washed three times with 50 v. of hexane, then boiled three times with 50 v. benzene. The pale brown, slightly sticky residue (15 w.) was boiled four times with 50 v. of ethanol and the insoluble residue collected, washed with ether and dried. A white powder (3 w.) was obtained which melted at 225° C. with decomposition, an odor of mercaptan being detected.

*Analysis.*—Found: Br, 25.6; Cl, 22.5; N, 4.4; S, 10.3%. C₉H₈BrCl₂NS requires: Br, 25.6; Cl, 22.7; N, 4.5; S, 10.2%.

*Example VIII.—Preparation of N-methyl-2,6-dichlorothiobenzamide*

N-methyl-2,6-dichlorobenzamide (2.02) and phosphorus pentasulfide (2.0 w.) in toluene (100 v.) were heated under reflux for 4 hours. The toluene layer was decanted and light petroleum (B.P. 40°–60° C.) added to precipitate the produce therefrom. The precipitate was recrystallized from a mixture of benzene and light petroleum. The product (2.0 w.) had M.P. 166° to 168° C.

*Analysis.*—Found: C, 43.2; H, 3.0; N, 6.4; Cl, 32.8; S, 14.7%. C₈H₇Cl₂NS requires: C, 43.6; H, 3.2; N, 6.4; Cl, 32.3; S, 14.5%.

*Example IX.—Preparation of N,N-dimethyl-2,6-dichlorothiobenzamide*

N,N-dimethyl-2,6-dichlorobenzamide (10.02) and phosphorus pentasulfide (10.02) in toluene (100 v.) were heated under reflux for 20 hours. The toluene layer was decanted, the solvent removed and the residue recrystallized for light petroleum (B.P. 80°–100° C.). The product had M.P. 131° to 133° C. Yield 6.0 w.

*Analysis.*—Found: C, 45.2; H, 3.9; N, 5.9; Cl, 30.0; S, 14.0%. C₉H₉Cl₂NS requires: C, 46.2; H, 3.9; N, 6.0; Cl, 30.3; S, 13.6%.

*Example X.—Preparation of N-phenyl-2,6-dichlorothiobenzamide*

This compound was prepared from N-phenyl-2,6-dichlorobenzamide (5.0 w.) by the method described in Example IX. The recrystallized product had M.P. 182° to 184° C. Yield 4.5 w.

*Analysis.*—Found: C, 54.9; H, 3.0; N, 5.1; Cl, 25.7; S, 11.6%. C₁₃H₉Cl₂NS requires: C, 55.3; H, 3.2; N, 5.0; Cl, 25.2; S, 11.3%.

*Example XI.—Preparation of S,S'-(1,4-but-2-enylene)-bis-2,6-dichlorothiobenzimidate and its dihydrobromide*

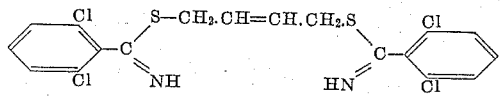

The dihydrobromide was prepared by heating a mixture of 2,6-dichlorothiobenzamide (4.1 w.) and 1,4-dibromobut-2-ene (4.3 w.) in ethyl alcohol (30 v.) for 2 hours. The precipitate formed was filtered off and washed with boiling acetone. The product melted at 201° to 203° C. Yield, 5.0 w.

*Analysis.*—Found: C, 34.4; H, 2.6; N, 4.4; Cl, 31.8; S, 10.2; Br, 25.6%. C₁₈H₁₄Cl₄N₂S₂2HBr requires: C, 34.5; H, 2.6; N, 4.5; Cl, 22.7; S, 10.2; Br, 25.6%.

The dihydrobromide (2.0 w.) was shaken with aqueous sodium bicarbonate solution in presence of ether. The ethereal layer was then separated, dried and evaporated. The residue (1.2 w.) was recrystallized from ethyl alcohol to give a product melting at 108° to 109° C.

*Analysis.*—Found: C, 46.1; H, 2.6; N, 6.4; Cl, 31.4; S, 14.3%. C₁₈H₁₄C₁₄N₂S₂ requires: C, 46.4; H, 3.0; N, 6.0; Cl, 30.6; S, 13.8%.

*Example XII.—Preparation of S,S'-(1,4-butylene)-bis-2,6-dichlorothiobenzimidate dihydrobromide*

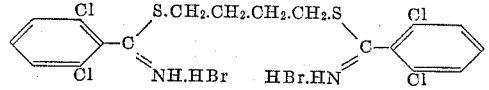

2,6-dichlorothiobenzamide (4.1 w.) and 1,4-dibromobutane (4.3 w.) in ethyl alcohol (30 v.) were heated under reflux for 6 hours. The precipitate was filtered off and washed with boiling acetone.

*Analysis.*—Found: C, 33.3; H, 2.7; N, 4.2; Cl, 22.2; S, 9.9; Br, 25.6%. $C_{18}H_{16}Cl_4N_2S_22HBr$ requires: C, 34.3; H, 2.9; N, 4.5; Cl, 22.6; S, 10.2; Br, 25.5%.

Compounds of the above general formula, particularly the 2,6-dihalo derivatives, exhibit high herbicidal activity. The results of herbicidal tests carried out with 2,6-dichlorothiobenzamide and various derivatives are summarized in the following Table. These tests were carried out as follows:

Aqueous compositions containing acetone (40 v.), water (60 v.), Triton X 155 (0.5% w./v.) and the thiobenzamide derivative stated in logarithmically varying concentrations were used. In the soil spray and soil drench tests, imbibed seeds and seedling plants, respectively, in sterile No. 1 John Innes compost, were sprayed at 50 gallons per acre or drenched at 1000 gallons per acre. In the foliar spray tests, similar seedling plants were sprayed with a volume equivalent to 50 gallons per acre. Control tests in which seeds and plants were similarly sprayed or drenched with the aqueous acetone-Triton X155 solution, only were also carried out. The phytotoxic effect of the thiobenzamide applied was assessed by determining the reduction from the control in fresh weight of stem and leaf of the test plants and a regression curve relating growth inhibition and dosage plotted. The dosage of the thiobenzamide required for 50% and 90% growth inhibition (G.I.) is given in the table. Dosages greater than 10 pounds per acre are indicated by X.

It can be seen from the table that in the soil spray test, 2,6-dichlorothiobenzamide, at a dosage of less than 0.9 pound per acre, causes 90% growth inhibition. It can be seen further that it has similar degrees of activity to both monocotyledons and dicotyledons so that this compound is an effective total pre-emergence herbicide. A similar order of activity is exhibited by 2-chloro-6-iodothiobenzamide and by the N-acetyl-, S-ethyl-, and S-2-bromoethyl 2,6-dichlorothiobenzimidates and their hydrogen halides. These compounds, and particularly 2,6-dichlorothiobenzamide, are therefore preferred compounds of the invention.

This invention relates further to compositions comprising a halothiobenzamide or haloisothiobenzamide, or salt thereof, as hereinbefore specified and a carrier or a surface active agent, or a carrier and a surface active agent.

The term "carrier" as used herein means a material, which may be inorganic or organic and synthetic or of or formulated to facilitate its storage, transport and handling and its application to the plant, seed, soil or other obing and its application to the plant, seed, soil or other object to be treated. The carrier is preferably biologically and chemically inert. It may be a solid or a fluid. Solid carriers are preferably particulate, granular or pelleted through other shapes and sizes are not thereby excluded. Solid carriers, generally obtainable in particulate, granular or pelleted form, may be naturally occurring minerals, though they may have been subjected to grinding, sieving, purification and other treatments. A particularly suitable carrier of this type is that available under the trade name Speswhite china clay. Other china clays of similar properties may also be used. Carriers produced synthetically, for example, synthetic hydrated silicon oxides and synthetic calcium silicates may also be used and many proprietary products of this type are available commercially. The product available as Silicium dioxyed No. 3 is a particularly suitable carrier of this type. The carrier may also be an elemental substance such as sulfur or carbon, preferably an activated carbon. If the carrier possesses intrinsic catalytic activity such that it would decompose the toxicant it is advantageous to incorporate a stabilizing agent.

For some purposes, a resinous or waxy carrier may be used, preferably, one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorphenol such as is available under the registered trademark "Aroclor," a bitumen, an asphaltite, a wax, for example, beeswax or a mineral wax such as paraffin wax or Montan wax, or a chlorinated mineral wax. Compositions comprising such resinous or waxy carriers are preferably in granular or pelleted form.

Fluid carriers may be liquids, for example, an aqueous fluid, or an organic fluid, including a liquefied normally vaporous or gaseous material, or a vaporous or gaseous material, and may be solvents or non-solvents for the active material. Suitable solvents include petroleum fractions boiling in the kerosene and gas oil ranges and aromatic extracts thereof, ketones such as acetone, methyl ethyl ketone, methyl isobutyl ketone and cyclohexanone,

TABLE

| Compound | G.I. Level, Percent | Growth Inhibition Dose, lb./acre | | | | | | | | | | | | | | | | | | | | |
|---|---|---|---|---|---|---|---|---|---|---|---|---|---|---|---|---|---|---|---|---|---|---|
| | | Seeds—Pre-emergence Soil Spray | | | | | | | Foliar Spray | | | | | | | Plants—Post-emergence Soil Drench | | | | | | |
| | | O | RG | SC | P | SB | L | M | O | RG | SC | P | SB | L | M | O | RG | SC | P | SB | L | M |
| 2,6-dichlorothiobenzamide | 50 | <0.9 | <0.9 | <0.9 | <0.9 | <0.9 | <0.9 | <0.9 | 6.8 | 3.0 | <1.0 | 3.4 | 2.5 | X | <1.0 | 1.0 | <1.0 | 4.8 | <1.0 | 1.4 | X | X |
| | 90 | <0.9 | <0.9 | <0.9 | <0.9 | <0.9 | <0.9 | <0.9 | X | X | (*) | X | X | X | (*) | X | X | X | X | 4.9 | X | X |
| 2-chloro-6-fluorothiobenzamide | 50 | (*) | (*) | (*) | (*) | (*) | (*) | (*) | (*) | (*) | (*) | (*) | (*) | (*) | (*) | <1.0 | <1.0 | <1.0 | X | 2.7 | X | 3.4 |
| | 90 | (*) | (*) | (*) | (*) | (*) | (*) | (*) | (*) | (*) | (*) | (*) | (*) | (*) | (*) | X | X | 8.0 | X | X | X | X |
| 2-chloro-6-iodothiobenzamide | 50 | <0.9 | <0.9 | 1.2 | 1.6 | <0.9 | <0.9 | <0.9 | 1.2 | 3.5 | <1.0 | 6.0 | 1.8 | X | 4.2 | <1.0 | <1.0 | 2.9 | X | 2.6 | X | 4.8 |
| | 90 | <0.9 | <0.9 | 3.0 | 3.8 | <0.9 | <0.9 | 3.2 | X | X | 3.1 | X | X | X | X | X | X | X | X | 9.0 | X | X |
| 2,6-dibromothiobenzamide | 50 | <0.1 | <0.9 | 0.7 | 0.7 | <0.1 | <0.1 | <0.1 | <1 | <1 | <1 | 5.3 | <1 | <1 | 1.9 | <1 | <1 | <1 | 102 | --- | --- | 11 |
| | 90 | <0.1 | <0.9 | 1.0 | 0.9 | <0.1 | <0.1 | <0.1 | | | | | | | | | | | | | | |
| N-acetyl 2,6-dichlorothiobenzamide | 50 | <0.9 | <0.9 | <0.9 | <0.9 | <0.9 | <0.9 | <0.9 | 6.7 | X | 1.2 | 4.2 | 2.6 | X | 2.5 | 3.6 | <1.0 | <1.0 | 8.5 | 2.6 | X | X |
| | 90 | <0.9 | <0.9 | 1.1 | <0.9 | <0.9 | <0.9 | <0.9 | X | 4.6 | X | X | X | X | X | X | X | X | X | X | X | X |
| S-ethyl 2,6-dichloro-thiobenzimidate HCl | 50 | <0.9 | <0.9 | 1.1 | 1.1 | <0.9 | <0.9 | <0.9 | 3.6 | 4.1 | <1.0 | 8.5 | X | X | 4.6 | <1.0 | <1.0 | <1.0 | 1.1 | <1.0 | X | 4.0 |
| | 90 | <0.9 | <0.9 | 1.7 | 1.7 | <0.9 | <0.9 | <0.9 | X | 8.8 | X | X | X | X | 7.0 | X | X | X | 5.9 | X | X | X |
| S-ethyl 2,6-dichlorothiobenzimidate HBr | 50 | <0.9 | <0.9 | 1.1 | <0.9 | <0.9 | <0.9 | <0.9 | 3.1 | 3.8 | 2.9 | 5.1 | 7.5 | X | 5.2 | <1.0 | 2.6 | <1.0 | 3.2 | <1.0 | X | X |
| | 90 | <0.9 | <0.9 | 1.7 | 1.4 | <0.9 | <0.9 | <0.9 | X | X | 6.0 | X | X | X | X | X | X | X | X | X | X | X |
| S-2-bromoethyl 2,6-dichlorothiobenzimidate | 50 | <0.9 | <0.9 | <0.9 | <0.9 | <0.9 | <0.9 | <0.9 | 2.6 | X | 3.3 | X | X | X | 9.7 | (*) | (*) | (*) | (*) | (*) | (*) | (*) |
| | 90 | <0.9 | <0.9 | 1.4 | 1.7 | <0.9 | <0.9 | 1.0 | X | X | 9.2 | X | X | X | X | (*) | (*) | (*) | (*) | (*) | (*) | (*) |
| S-ethyl 2,6-dichlorothiobenzimidate | 50 | <0.9 | <0.9 | 1.0 | 1.3 | <0.9 | <0.9 | <0.9 | 2.2 | 1.0 | 2.2 | X | 6.1 | X | 6.5 | <1.0 | <1.0 | <1.0 | X | 1.1 | X | X |
| | 90 | <0.9 | <0.9 | X | 2.7 | <0.9 | <0.9 | 1.7 | X | 5.2 | X | X | X | X | 7.6 | X | X | 2.2 | X | X | X | X |
| 2-chlorothiobenzamide | 90 | 4.0 | 6.8 | <10 | 8.4 | 6.2 | 7.3 | 9.0 | X | 5.2 | X | X | X | --- | 4.0 | X | X | X | X | X | X | X |
| 3-chlorothiobenzamide | 50 | X | X | X | X | X | X | X | X | X | X | X | X | 7.9 | --- | 5.0 | X | X | X | X | X | X |
| 4-chlorothiobenzamide | 50 | X | X | X | X | X | X | X | X | X | X | X | X | X | X | X | X | X | X | X | X | X |
| Thiobenzamide | 50 | X | X | X | X | X | X | X | X | X | X | X | X | X | X | X | X | X | X | X | X | X |

*Not tested.
O=oats, RG=ryegrass, SC=sweet corn, P=peas, SB=sugar beet, L=linseed, M=mustard, X=>10 lbs./A.

aromatic hydrocarbons, such as benzene, toluene, and chlorinated hydrocarbons, for example, carbon terachloride and the dichlorbenzenes.

The carrier may also be a simple or compound fertilizer which may be a solid, preferably granular or pelleted, or a liquid, for example an aqueous solution.

The carrier may be mixed or formulated with the active material during its manufacture or at any stage subsequently. The carrier may be mixed or formulated with the active material in any proportion. One or more carriers may be used.

The compositions of the invention may be concentrates, suitable for storage or transport and containing, for example, from 10 to 95% by weight of the substituted thiobenzamide. These can be diluted with the same or a different carrier to a concentration suitable for application. The compositions of the invention may also be dilute compositions suitable for application. In general, concentrations of 0.01 to 0.5% by weight, of active material based on the total weight of the composition are satisfactory, though lower nad higher concentrations can be applied if necessary. Effective weed control is obtainable by applying the compositions at the rate of 1 to 20 pounds per acre of the thiobenzamide.

The compositions of the invention may be formulated as dusts. These comprise an intimate mixture of the thiobenzamide and a finely powdered solid carrier such as is indicated above, particularly Speswhite china clay or its equivalent, or Silicium dioxyd No. 3. These powder carriers may be oil-treated to improve adhesion to the surface to which they are applied. These dusts may be concentrates, in which case a highly sorptive carrier is preferably used. These require to be diluted with the same or a different finely powdered carrier, which may be of lower sorptive capacity, to a concentration suitable for application.

The compositions of the invention may be formulated as wettable powders comprising a major proportion of the thiobenzamide mixed with a dispersing, i.e., deflocculating or suspending, agent and, if desired, a finely divided solid carrier, particularly a china clay of the type of Speswhite china clay or Silicium dioxyd No. 3. The thiobenzamide may be in particulate form or adsorped on the carrier anl preferably constitutes at least 10%, more preferably at least 50% by weight of the composition. The concentration of the dispersing agent should in general be between 0.1 and 10% by weight of the total composition though larger or smaller amounts may be used if desired.

The dispersing agent used in the composition of the invention may be any substance having definite dispersing, i.e., deflocculating or suspending properties as distinct from wetting properties, although these substances may also possess wetting properties.

The dispersing agent used may be a protective colloid such as gelatin, glue, casein, gums or synthetic polymeric material such as polyvinyl alcohol. Preferably however, the dispersing agents used are sodium or calcium salts of high molecular weight sulfonic acids, e.g., the sodium or calcium salts of lignin sulfonic acids derived from sulfite cellulose waste liquors. The calcium or sodium salts of condensed aryl sulfonic acids, and sodium salts of polyacrylic acids are also suitable.

The dispersing agents used may be non-ionic or ionic, for example, the condensation products of fatty acids containing at least 12, preferably 16 to 20, carbon atoms in the molecule. or of abietic acid or naphthenic acids obtained in the refining of petroleum lubricating oil fractions. with alkylene oxides such as ethylene oxide or propylene oxide or with both ethylene oxide and propylene oxide; partial esters of the above acids with polyhydric alcohols such as glycerol, polyglycerol, sorbitol or mannitol, or condensation products of alkyl phenols with the above alkylene oxides or their sulfated or sulfonated derivatives.

The dispersing agents referred to above may also possess wetting properties but in general it is preferable to incorporate two separate surface active agents, one having particularly good dispersing properties and the other having particularly good wetting properties. The actual amount of wetting agent incorporated can be varied considerably and in general of from 0 to 10% by weight based on the total composition.

Suitable wetting agents include the alkali metal salts, preferably sodium salts, of sulfuric acid esters or sulfonic acids containing at least 10 carbon atoms in the molecule, for example, sodium lauryl sulfate or the sodium secondary alkyl sulfates available under the registered trademark "Teepol," sodium salts of sulfonated castor oil, sodium dodecyl benzene sulfonate. Non-ionic wetting agents may also be employed, for example, polyalkylene oxide polymers, e.g., the "Pluronics," and condensation products of polyalkylene oxides with aromatic nuclei (e.g., octyl cresol).

Granulated or pelleted compositions comprising a suitable carrier having a thiobenzamide incorporated therewith are also included in the invention. These may be prepared by impregnating a granular carrier with a solution of the thiobenzamide or by granulating a mixture of a finely divided solid carrier and the thiobenzamide. The carrier used may consist of or contain a fertilizer or fertilizer mixture, for example superphosphate.

The compositions of the invention may also be formulated as solutions of thiobenzamide in an organic solvent or mixture of solvents. Suitable solvents include alcohols, ketones, especially acetone, methyl ethyl ketone, methyl isobutyl ketone, cyclohexanone, ethers, aromatic hydrocarbons and chlorinated hydrocarbons. Petroleum hydrocarbon fractions used as solvents should preferably have a flash point about 73° F., for example, a refined aromatic extract of kerosene. Auxiliary solvents such as alcohols, ketones and polyalkylene glycol ethers and esters may be used in conjunction with these petroleum solvents. Such oil solutions are particularly suitable for application by low volume spraying for example at the rate of 5 to 10 gallons per acre. They may also be diluted with a cheap solvent for high volume spraying.

Compositions of the present invention may also be formulated as emulsifiable concentrates which are concentrated solutions or dispersions of the thiobenzamide in an organic liquid, preferably a water-soluble organic liquid, containing an added emulsifying agent. These concentrates may also contain a proportion of water, for example, up to 50% by volume, based on the total composition (i.e., a "mayonnaise" composition) to facilitate subsequent dilution with water. Suitable organic liquids are, for example, the above petroleum hydrocarbon fractions as described above.

The emulsifying agent may be of the type producing water-in-oil type emulsions which are suitable for application by low volume spraying, or an emulsifier of the type producing oil-in-water emulsions may be used, producing concentrates which can be diluted with relatively large volumes of water for application by high volume spraying. In such emulsions, the thiobenzamide is preferably in the non-aqueous phase.

Suitable types of emulsifier for use in these emulsions or emulsifiable concentrates are the non-ionic and anionic dispersing and wetting agents described above, also suitable are long chain alkyl ammonium salts and alkyl sulfosuccinates.

The concentration of emulsifier used will, in general, be within the limits 0.5% and 25.0% based on the final composition.

The compositions of the invention may contain other ingredients, for example, water conditioning agents, for example, sodium polyphosphates, cellulose ethers, or ethylene diamine tetra acetic acid, other herbicides, pesticides or stickers, for example, a non-volatile oil.

Aqueous dispersions and emulsions, for example, compositions obtained by diluting the wettable powders or emulsifiable concentrates of the present invention with water also lie within the scope of the present invention.

I claim as my invention:

1. A herbicidal composition comprising
   (a) a herbicidally effective amount of the compound of the formula

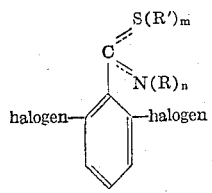

wherein $m=0$ to $1$, $n=1$ to $2$, and $m+n=2$; R represents a member of the group consisting of hydrogen, alkyl of 1 to 4 carbon atoms and phenyl when $n=1$; and when $n=2$, R is alkyl of 1 to 4 carbon atoms; and R′ represents a member of the group consisting of hydrogen, alkyl of 1 to 4 carbon atoms, chloro-alkyl of 1 to 4 carbon atoms, bromo-alkyl of 1 to 4 carbon atoms, and acyl of 1 to 4 carbons, and (b) an inert horticultural diluent therefor.

2. A herbicidal composition comprising a herbicidally effective amount of 2,6-dichlorothiobenzamide and an inert horticultural diluent therefor.

3. A method for eradicating weeds from areas to be used for growing crops which comprises applying to said areas a herbicidal effective amount of the compound of the formula

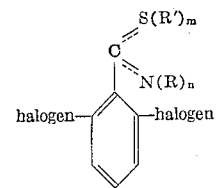

wherein $m=0$ to $1$, $n=1$ to $2$, and $m+n=2$; R represents a member of the group consisting of hydrogen, alkyl of 1 to 4 carbon atoms and phenyl when $n=1$; and when $n=2$, R is alkyl of 1 to 4 carbon atoms; and R′ represents a member of the group consisting of hydrogen, alkyl of 1 to 4 carbon atoms, chloro-alkyl of 1 to 4 carbon atoms, bromo-alkyl of 1 to 4 carbon atoms, and acyl of 1 to 4 carbons, the concentration of said compound in the herbicidical composition amounting to from about 0.01 to about 95 percent by weight of said composition.

4. A method for eradicating weeds from areas to be used for growing crops which comprises applying to said areas a herbicidal effective amount of 2,6-dichlorothiobenzamide, the concentration of said compound in the herbicidial composition amounting to from about 0.01 to about 95 percent by weight of said composition.

References Cited by the Examiner

UNITED STATES PATENTS 2,577,969   12/1951   Jones _____ 71—2.6

OTHER REFERENCES

Fairfull et al.: J. Chem. Soc., 1952, pp. 742 to 744.

LEWIS GOTTS, *Primary Examiner.*

JAMES O. THOMAS, Jr., *Examiner.*